United States Patent [19]

Itoh et al.

[11] 4,139,494

[45] Feb. 13, 1979

[54] CATALYST FOR HYDROFINING PETROLEUM WAX

[75] Inventors: Takuji Itoh, Sayama; Satoshi Sakurada, Omiya; Shohei Okano, Tokorozawa; Takashi Obayashi, Kawagoe; Takeo Toyoizumi, Ohi; Osami Iwata, Kawagoe, all of Japan

[73] Assignee: Toa Nenryo Kogyo Kabushiki Kaisha, Tokyo, Japan

[21] Appl. No.: 832,434

[22] Filed: Sep. 12, 1977

[30] Foreign Application Priority Data

Sep. 14, 1976 [JP] Japan ............................. 51-110501

[51] Int. Cl.$^2$ ..................... B01J 29/06; B01J 29/00; B01J 29/10
[52] U.S. Cl. ............................... 252/455 R; 252/458; 252/459; 208/27
[58] Field of Search ................. 252/455 R, 458, 459; 208/27

[56] References Cited

U.S. PATENT DOCUMENTS

| 2,915,448 | 12/1959 | Annable et al. ..................... 208/27 |
|---|---|---|
| 3,206,387 | 9/1965 | Smilski ................................. 208/27 |
| 3,770,618 | 11/1973 | Adams et al. ..................... 252/455 R |
| 3,843,509 | 10/1974 | Suto et al. ........................ 252/455 R |
| 3,900,427 | 8/1975 | Riley et al. ....................... 252/455 R |

FOREIGN PATENT DOCUMENTS 2644519  4/1977  Fed. Rep. of Germany ............. 208/27

*Primary Examiner*—Carl Dees
*Attorney, Agent, or Firm*—Edward M. Corcoran

[57] ABSTRACT

A catalyst and process are described for hydrofining petroleum wax comprising contacting the wax with hydrogen in the presence of a catalyst comprising at least one metal hydrogenating component on a porous alumina/silica carrier containing from about 0.2 to 5 wt.% of an alkali metal component, the catalyst having a specific surface area of about 200 to 300 m$^2$/g and being further characterized in that (a) the volume of pores having a diameter in the range of 60 to 150 Å is greater than 80% of the volume of pores having a diameter in the range of 0 to 150 Å and (b) the volume of pores having a diameter in the range of 0 to 600 Å is in the range of about 0.45 to 0.60 ml/g.

10 Claims, No Drawings

CATALYST FOR HYDROFINING PETROLEUM WAX

BACKGROUND OF THE INVENTION

1. Field of the Invention

This invention relates to a catalyst and process for hydrofining petroleum waxes. More particularly, this invention relates to a catalyst and process for hydrofining petroleum waxes using a catalyst comprising a metal hydrogenation component supported on a porous carrier containing alkali metal compound wherein the carrier possesses a novel pore distribution. Still more particularly, this invention relates to a process and catalyst for improving the thermal, light and UV stability of petroleum waxes by contacting the wax with hydrogen in the presence of a catalyst comprising at least one metal hydrogenating component on a porous alumina/silica carrier containing minor amounts of alkali metal and having a novel pore structure defined by the volume of pores having a diameter in the range of 60 to 150 Å being greater than 80% of the volume of pores having a diameter in the range of 0 to 150 Å and the volume of pores having a diameter in the range of 0 to 600 Å being in the range of about 0.45 to 0.60 ml/g.

2. Description of the Prior Art

Naturally occurring petroleum waxes must be refined in order to provide high quality waxes of improved thermal, light and ultra-violet stability. Although treating raw wax with sulfuric acid or contacting it with absorbent clay has been used for improving the color, storage stability and oxidation resistance, it is now preferred to hydrorefine or hydrofine the wax in order to improve these properties, particularly when the wax is to be used for foods and drugs which requires a very highly refined wax in order to satisfy the requirements of the United States Food and Drug Administration (FDA). Hydrofining improves the properties of the wax by removing therefrom a very small amount of polar substances and other impurities and by hydrogenation or ring scission of polycyclic aromatic molecules. In order to produce a highly refined, high quality wax it is necessary for the hydrofining catalyst to have a sufficient amount of activity to be technically practical.

SUMMARY OF THE INVENTION

The present invention relates to a catalyst and process for hydrofining petroleum wax which comprises contacting the wax with hydrogen in the presence of a catalyst comprising at least one metal hydrogenating component on a porous alumina/silica carrier containing from about 5 to 25 wt.% of silica and 0.2 to 5 wt.% of an alkali metal component, said catalyst being further characterized in that:

(a) the volume of pores having a diameter in the range of 60 to 150 Å is greater than 80% of the volume of pores having a diameter in the range of 0 to 150 Å; and (b) the volume of pores having a diameter in the range of 0 to 600 Å is in the range of from about 0.45 to 0.60 ml/g. In a preferred embodiment, the catalyst has a specific surface area ranging from about 200 to 300 m$^2$/g.

The carrier used for the catalyst of this invention is alumina or an alumina-containing material containing from about 5 to 25 wt.% of silica and about 0.2 to 5 wt.% (as oxide) of an alkali metal component. It is preferred that the alumina be gamma-alumina, alpha-alumina, eta-alumina or mixture thereof having the pore distribution characteristics of this invention. However, the alumina may be in the form of an alumina-containing material comprising alumina combines with one or more other refractory inorganic materials such as magnesia, calcium oxide, zirconia, titania, boria, hafnia, and a crystalline zeolite. These refractory inorganic oxides and zeolite may be present in the catalyst in an amount ranging from about 1 to 10 wt.% based on the alumina/silica content of the catalyst. As hereinbefore described, supra, the silica content of the catalyst will range from about 5 to 25 wt.% and more preferably from about 8 to 20 wt.% of the carrier. If the silica content is outside of this broad range, it has been found that the activity of the catalyst is reduced or the wax decomposes to an excessive extent to form oils.

The alkali metal component of the catalyst will be one or more metals selected from the group consisting of lithium, potassium and sodium supported on the carrier as oxides. The amount of alkali metal component will be in the range of from about 0.2 to 5 wt.% and preferably from about 0.3 to 1 wt.% of the carrier.

In preparing the catalyst carrier or base, conditions such as temperature and time in the steps of precipitating hydrates and aging of the hydrates are controlled so as to obtain a catalyst having the desired pore distribution and characteristics. One may start with water-soluble acidic aluminum compounds or water-soluble alkaline aluminum compounds such as aluminum sulfates, chlorides and nitrates, alkali metal aluminates, aluminum alkoxides and other inorganic or organic salts. Water-soluble silicon compounds such as alkali metal silicates (preferably $Na_2O:SiO_2 = 1:2-1:4$), tetraalkoxysilanes and orthosilisic acid esters are suitable. These aluminum and silicon compounds can be used as aqueous solutions. The concentration of these aqueous solutions in the case of an aluminum compound solution should be within the range of about 0.1 to 4.0 moles. In a preferred process for preparing an alumina/silica carrier suitable in the use of this invention, the alumina and silica are coprecipitated. However, other precipitation processes or gel mixing processes can also be employed.

The metal hydrogenation components of the catalyst will comprise one or more metals selected from the group consisting of metals of Groups VI and VIII of the Periodic Table such as chromium, molybdenum, tungsten of Group VI and iron, cobalt, nickel, palladium, platinum, osmium, iridium, ruthenium and rhodium of Group VIII. Combinations of metals of Groups VI and VIII may also be used. Preferred combinations are molybdenum-cobalt, molybdenum-nickel, tungsten-nickel, molybdenum-cobalt-nickel and tungsten-cobalt-nickel. Particularly preferred hydrogenating components are those which contain nickel. Further, metals of Group VII such as manganese and metals of Group IV such as tin and germanium may also be incorporated into the catalyst. The metal hydrogenation components will preferably be in the oxide and/or sulfide form.

The catalyst can be used in the form of a fixed bed, fluidized or moving bed system in the hydrofining reaction. However, a fixed or solid bed system is preferred from the viewpoint of operability. Also, two or more reactors can be combined together for achieving the hydrofining in two steps to attain a highly purified wax.

The petroleum waxes to be hydrofined in the process of this invention include raw paraffin waxes and raw microcrystalline waxes. These waxes contain polycyclic aromatic compounds and impurities such as sulfur compounds and nitrogen compounds. These waxes may be separated from vacuum distillates from residua or combination thereof. Wax containing vacuum distillates generally comprise hydrocarbons boiling in the range of from about 300° to 400° C. or higher, whereas residual materials comprise hydrocarbons boiling within the range of from about 400° to 500° C. or higher. As is well known in the art, waxes may be separated from wax bearing hydrocarbon oils by a variety of solvent dewaxing processes employing autorefrigerants, mixtures of autorefrigerants and ketones, mixtures of ketones and aromatic solvents, etc. Still further, adsorption dewaxing processes employing adsorbents such as natural or synthetic zeolites can be used as well as urea dewaxing processes. In any event, it is preferred to deoil the wax before it is used in the process of this invention.

Reaction conditions in the hydrofining process of this invention comprise temperatures within the broad range of from about 180° to 330° C. and preferably from about 200° to 300° C., pressures within the range of from about 30 to 200 kg/cm$^2$ and preferably from about 50 to 100 kg/cm$^2$, a hydrogen-containing gas rate within the range of from about 50 to 1500 1/1 (liters per liter), preferably 200 to 1000 1/1 and a liquid hourly space velocity within the range of from about 0.2 to 2.0 V/H/V (volumes per hour per volume), preferably from about 0.5 to 1.5 V/H/V. The hydrogen-containing gas will contain from about 60 to 100% of hydrogen. When the hydrofining is carried out in two stages, the reaction conditions selected for the respective stages may either be the same or different. When different reaction conditions are to be used in the respective stages, it is preferred that more severe conditions be used in the second stage than in the first stage. It should be noted that with the catalyst of this invention it has been found that a relatively high hydrofining rate can be attained even when the reaction conditions are not relatively severe, particularly with lower pressures, without suffering much deterioration in the activity of the catalyst.

PREFERRED EMBODIMENT

The invention will be more apparent from the preferred embodiment and working examples set forth below.

Catalyst Preparation

In a preferred embodiment of preparing a catalyst useful in this invention, an aqueous solution of an alkali hydroxide or an alkali aluminate and an alkali silicate is added to an acidic aqueous aluminum solution (preferably in the range of about 0.3 to 2 moles) to form an alumina/silica hydrogel or hydrosol at room temperature and at a pH in the range of from about 6.0 to 11.0, preferably from about 8.0 to 10.5. Aqueous ammonia, acetic acid or the like is then added to the hydrogel to control the pH. The suspension is then heated to a temperature of from about 50° to 98° C. and kept there for at least two hours to precipitate the alumina/silica. The resulting precipitates are filtered, washed with ammonium acetate and water, dried at a temperature in the range of from about room temperature to about 200° C. and then calcined by heating to a temperature in the range of from about 200° to 800° C. in the presence of oxygen.

The alkali metal component of the carrier may be incorporated therein merely by immersing the carrier in a solution of alkali metal component and then calcining the carrier. The metal hydrogenation components may be impregnated onto the carrier by immersing the carrier in a solution of soluble salt of said metal or via a coprecipitation method wherein the metal hydrogenation component is coprecipitated in the preparation of the carrier. However, the impregnation method is preferred. It is to be understood of course that the quantity and concentration of the impregnation solution is controlled in order to deposit the desired amount of metal on the carrier. When two or more metal components are to be impregnated on the carrier, they may either be impregnated together using a mixture of two or more metal components in solution or each one may be impregnated separately. In any event, the impregnation solution is separated from the carrier which is then washed with water, dried and calcined. The drying and calcination may be carried out under the same conditions used in the preparation of the carrier described, supra. The amount of metal deposited on the carrier will range from about 0.1 to 20 wt.% for metals of Group VIII and from about 5 to 20 wt.% for metals of Group VI, based on the total catalyst weight.

The catalyst may be molded into any desired shape such as cylinders, granules, tablets, etc. by extrusion molding, granulation molding or the like. Preferably the catalyst will be molded into particles having a diameter within the range of from about 0.5 to 3.0 mm. The finished catalyst will have a total pore volume of from about 0.5 to 1.0 ml/g, a bulk density of about 0.5 to 1.0 g/ml and a side crushing strength of about 0.8 to 3.0 kg/ml in addition to the other characteristics mentioned under SUMMARY OF THE INVENTION, supra.

It is preferable to sulfide the catalyst before using it in the hydrofining reaction of this invention. The catalyst can thus be sulfided during the manufacture thereof or after being charged into the reactor. If the catalyst is to be sulfided after being charged to the reactor, it may be contacted with a sulfur-containing petroleum distillate at a temperature ranging from about 150° to 400° C. under a pressure (total pressure) of about 20 to 100 kg/cm$^2$ and at a liquid hourly space velocity of from about 0.3 to 2.0 V/H/V in the presence of about 50 to 1500 1/1 of a hydrogen-containing gas. After the catalyst has been sulfided, the sulfur-containing distillate is replaced with the untreated or raw wax and conditions in the reactor are changed to those suitable for the hydrorefining process of this invention. Alternatively, the catalyst can be sulfided by contacting same directly with a sulfur compound such as hydrogen sulfide or by adding hydrogen sulfide or CS$_2$ to a suitable distillate and then contacting the sulfur-containing distillate with the catalsyt.

Determination of the Catalyst Pore Structure

It is known in the art that a gas adsorption method such as the nitrogen adsorption method is advised for determining pores having a diameter within the range of from 0 to 600 Å, while a mercury porosimeter method is used for the larger pores whose diameter is greater than 600 Å. These methods are disclosed in P. H. Emmett, et al, "Catalysis" 1, 123 (1959) published by Reinhold Publishing Co.) and "Shokubai Kogaku Koza (Lectures on catalyst Engineering )" 4, 69-78 (1964) published by Chijin Shokan Co. (Japan). In this invention the nitrogen adsorption method was used to determine the pore volume of pores having a diameter of from 0 to 600 Å, while the mercury porosimeter method was used for determining the pore volume of pores having a diameter greater than 600 Å.

In the mercury porosimeter method, contact angle between mercury and the catalyst was 140°, surface tension was 480 dyne/cm and all pores were considered to be cylindrical. For the nitrogen adsorption method, various correction methods have been proposed. Among them, BJH method [E. P. Barrett, L. G. Joyner and P. P. Hallend, "J. Amer. Chem. Soc." 73, 373 (1951)] and CI method [R. W. Cranston and F. A. Inkley, "Advances in Catalysis" 1X, 143 (1957) (New York Academic Press)] are employed generally. Data relating to the pore structure and volumes in this invention were obtained by making calculations according to the DH method [D. Dollimore and G. R. Heal, "J. Appl. Chem." 14, 109 (1964)] from adsorption data of adsorption isotherms.

All of these methods and references are known in the art and are discussed in U.S. Pat. No. 3,994,503, in column 5, lines 32-68 and in column 6, lines 10-36, the disclosures of which are incorporated herein by reference.

EXAMPLE 1

An alumina hydrogel was prepared from aluminum sulfate, sodium hydroxide and water glass No.3 (Japanese Industrial Standard K-1408) as starting materials. The alumina hydrogel was washed and then subjected to an aging treatment at 75° C. for 2 hours. Precipitates thus formed were separated from the solution, dried, mixed with water and extrusion/molded into cylinders of a diameter of about 1.5 mm. The molded cylinders were calcined to obtain a carrier for catalyst. Molybdenum and nickel from aqueous ammonium molybdate and nickel nitrate solutions were deposited on the carrier thus obtained to form catalyst A. For comparitive purposes a commercial Ni/Mo/Al$_2$O$_3$ catalyst (catalyst B) was also used. Compositions and physical properties of catalysts A and B are shown in Table 1.

TABLE 1

COMPOSITION AND PROPERTIES OF CATALYSTS A AND B

|  | A | B |
|---|---|---|
| Composition |  |  |
| MoO$_3$ (wt. %) | 15.1 | 15.3 |
| NiO (wt. %) | 4.2 | 4.1 |
| Na$_2$O (wt. %) | 0.54 | 0.09 |
| SiO$_2$ (wt. %) | 11.9 | 3.5 |
| Al$_2$O$_3$ (wt. %) | Balance | Balance |
| Specific surface area (m$^2$/g) | 259 | 286 |
| Pore volume (ml/g) |  |  |
| 0 - 600 Å | 0.559 | 0.565 |
| 0 - 60 Å | 0.004 | 0.056 |
| 60 - 150 Å | 0.044 | 0.104 |
| 150 - 180 Å | 0.175 | 0.162 |
| 180 - 240 Å | 0.151 | 0.109 |
| 240 - 300 Å | 0.094 | 0.105 |
| 300 - 600 Å | 0.051 | 0.048 |
| P V I (%) | 91.4 | 65 |
| Bulk density (g/ml) | 0.69 | 0.680 |
| PVI = (60 - 150 Å/0 - 150 Å) × 100 |  |  |

A raw paraffin wax was introduced together with 150 L/L hydrogen/hydrocarbon) of hydrogen in a reactor filled with catalyst A at a reaction temperature of 250° C. under a hydrogen pressure of 60 kg/cm$^2$ and at a liquid hourly space velocity of 0.5 V/H/V to effect the hydrofining reaction. The properties of both the raw and hydrofined wax are shown in Table 2. The same raw paraffin wax was hydrofined with catalyst B under the same conditions as with catalyst A. These results are also listed in Table 2.

TABLE 2

RESULTS OF PARAFFIN WAX HYDROFINING

|  | Raw Wax | Catalyst A | Catalyst B |
|---|---|---|---|
| Color (Saybolt) | 16 | 30+ | 30 |
| Thermal Stability (Saybolt) 160° C × 2 hours | −1 | 30+ | 28 |
| Light Stability (Saybolt) Direct rays of sun, 15 days | −3 | 28 | 20 |
| Melting Point (° C.) | 58.8 | — | — |
| Oil Content (wt. %) | 0.185 | 0.203 | 0.445 |
| Ultraviolet Absorbance (L/100 g.cm) at 270 mµ | 1.65 | 0.018 | 0.081 |
| Sulfur Content (ppm) | 3 | 0 | — |
| Nitrogen Content (ppm) | 2 | 0 | — |

Note: Thermal Stability: Wax was taken in a test tube of an outside diameter of 3 cm and a depth of 10 cm and then heated in a bath at 160° C for two hours and color thereof was determined. Light Stability: A column of wax (1 inch × 1 inch × 10 cm) was placed on a horizontal surface of an experiment stand at a distance of 1 m from a window and exposed to direct rays of the sun continuously for 15 days. Then, the wax was molten and color thereof was determined.

EXAMPLE 2

The same wax material as in Example 1 was subjected to hydrofining treatment under the same conditions as in Example 1 except that catalysts C, D and E having compositions and physical properties shown in Table 3 were used to obtain the results shown in Table 4.

To prepare the catalyst, a hydrogel was prepared from aluminum sulfate, sodium hydroxide and water glass No. 3 as main starting materials. The hydrogel was washed repeatedly twice so as to sufficiently eliminate sodium hydroxide which would form Na$_2$O by calcination. The hydrogel was dried, then added with water again and molded into cylinders of a diameter of about 1.5 mm with an extrusion molding machine. The carrier in the form of cylinders was calcined to obtain alumina/silica carrier. Molybdenum and nickel from aqueous ammonium molybdate solution and aqueous nickel nitrate solution, respectively, were supported on the carrier thus obtained to form catalyst C. Conditions of washing step with water were varied to obtain catalysts D and E.

TABLE 3

Composition and Properties of Catalysts C, D And E

|  | Catalyst C | Catalyst D | Catalyst E |
|---|---|---|---|
| Composition |  |  |  |
| MoO$_3$ (wt. %) | 19.1 | 14.5 | 15.8 |
| NiO (wt. %) | 5.07 | 4.05 | 4.10 |
| Na$_2$O (wt. %) | 0.10 | 0.06 | 0.15 |
| SiO$_2$ (wt. %) | 11.9 | 11.9 | 10.4 |
| Al$_2$O$_3$ | Balance | Balance | Balance |
| Specific surface area (m$^2$/g) | 221 | 294 | 276 |
| Pore volume (ml/g) |  |  |  |
| 0 - 600 Å | 0.414 | 0.570 | 0.538 |
| 0 - 60 Å | 0.023 | 0.024 | 0.041 |
| 60 - 150 Å | 0.079 | 0.013 | 0.107 |
| 150 - 180 Å | 0.141 | 0.168 | 0.155 |
| 180 - 240 Å | 0.103 | 0.116 | 0.103 |
| 240 - 300 Å | 0.034 | 0.110 | 0.082 |
| 300 - 600 Å | 0.034 | 0.049 | 0.050 |
| P V I (%) | 78 | 73.3 | 72.6 |
| Bulk Density (g/ml) | 0.85 | 0.64 | 0.73 |

PVI = (60 - 150 Å/0 - 150 Å) × 100

TABLE 4
PROPERTIES OF HYDROFINED WAX

| | Catalyst C | Catalyst D | Catalyst E |
|---|---|---|---|
| Color (Saybolt) | 30+ | 30+ | 30 |
| Thermal Stability 160° C. × two hrs. | 29 | 28 | 28 |
| Light Stability Direct rays of the sun, 15 days | 18 | 19 | 18 |
| Oil Content (wt. %) | 0.40 | 0.25 | 0.293 |
| Ultraviolet Absorbance (L/100 g.cm) at 270 mμ | 0.0453 | 0.060 | 0.0935 |

EXAMPLE 3

The same raw wax as in Example 1 was subjected to hydrofining treatment under the same conditions as in Example 1 except that catalysts I, J and K having compositions and physical properties shown in Table 5 were used to obtain the results shown in Table 6.

TABLE 5
Composition and Properties of Catalysts I, J And K

| | Catalyst I | Catalyst J | Catalyst K |
|---|---|---|---|
| Composition | | | |
| $MoO_3$ (wt. %) | 15.1 | 13.4 | 17.4 |
| NiO (wt. %) | 3.6 | 4.8 | 5.3 |
| $Na_2O$ (wt. %) | 0.7 | 0.04 | 0.9 |
| $SiO_2$ (wt. %) | 20.2 | 18.7 | 4.3 |
| $Al_2O_3$ | Balance | Balance | Balance |
| Specific surface area (m²/g) | 275 | 289 | 233 |
| Pore volume (ml/g) | | | |
| 0 – 600 Å | 0.511 | 0.568 | 0.473 |
| 0 – 60 Å | 0.037 | 0.022 | 0.017 |
| 60 – 150 Å | 0.103 | 0.101 | 0.098 |
| 150 – 180 Å | 0.127 | 0.155 | 0.129 |
| 180 – 240 Å | 0.136 | 0.115 | 0.106 |
| 240 – 300 Å | 0.030 | 0.099 | 0.077 |
| 300 – 600 Å | 0.028 | 0.047 | 0.043 |
| P V I (%) | 74 | 82 | 85 |
| Bulk Density (g/ml) | 0.721 | 0.724 | 0.773 |

TABLE 6
PROPERTIES OF HYDROFINED WAX

| | Catalyst I | Catalyst J | Catalyst K |
|---|---|---|---|
| Color (Saybolt) | 30 | 30+ | 30 |
| Thermal Stability (Saybolt) | | | |
| 160° C. × 2 hours | 27 | 29 | 28 |
| 180° C. × 3 hours | 18 | 19 | 18 |
| Light Stability (Saybolt) Direct rays of the sun, 15 days | 18 | 18 | 17 |
| Oil Content (wt. %) | 0.35 | 0.53 | 0.27 |
| Ultraviolet Absorbance (L/100 g.cm) at 270 mμ | 0.051 | 0.034 | 0.086 |

EXAMPLE 4

Catalytic hydrofining in two stages was carried out under reaction conditions shown below in the presence of a Co/Mo/$Al_2O_3$-$SiO_2$ (catalyst F) obtained by supporting 3.5 wt.% (as CoO) of cobalt instead of nickel on the catalyst carrier (catalyst A) prepared in Example 1. Raw material was raw microcrystalline wax shown in Table 7. The results are also shown in Table 8.

TABLE 7
TWO-STAGE HYDROFINING CONDITIONS

| | The first stage | The second stage |
|---|---|---|
| Temperature (° C.) | 320 | 260 |
| Liquid hourly space velocity (V/H/V) | 0.5 | 0.5 |
| Pressure (kg/cm²) | 50 | 50 |
| Hydrogen/hydrocarbon (L/L) | 200 | 200 |
| Amount of catalyst filled (ml) | 300 | 300 |

TABLE 8
TWO-STAGE HYDROFINED WAX PROPERTIES

| | Raw Wax | Catalyst F | Catalyst L |
|---|---|---|---|
| Color (ASTM D-1500-64) | 8+ | 0.4 | 1.7 |
| Melting Point (° C.) | 83.6 | 85.5 | 83.6 |
| Thermal Stability 160° C. × 5 hours Color (Union) | — | 4.0 | 7.3 |
| Total acid number (mg/KOH) | — | 7.98 | 8.90 |
| FDA Standard* | Not satisfied | Satisfied | Not satisfied |
| Ultraviolet Absorbance (1/100 g.cm) | | | |
| 280/289 mμ | — | 0.027 | 0.11 |
| 290/299 mμ | — | 0.044 | 0.12 |
| 300/359 mμ | — | 0.062 | 0.09 |
| 360/400 mμ | — | 0.013 | 0.018 |
| Oil Content (wt. %) | — | 0.57 | 0.67 |

*Ultraviolet absorbance is determined as follows according to FDA standard 121. 1156.

| Wave length (mμ) | Absorbance (1/100.cm) |
|---|---|
| 280/289 | below 0.15 |
| 290/299 | below 0.12 |
| 300/359 | below 0.08 |
| 360/400 | below 0.02 |

EXAMPLE 5

The same raw wax as in Example 4 was subjected to hydrofining treatment under the same conditions as in Example 4 except that catalyst L shown in Table 9 was used. The results are shown in above Table 8 for comparison.

TABLE 9
COMPOSITION AND PROPERTIES OF CATALYST L

| Composition | |
|---|---|
| $MoO_3$ (wt. %) | 12.5 |
| CoO (wt. %) | 3.5 |
| $Na_2O$ (wt. %) | 0.05 |
| $SiO_2$ (wt. %) | 0.3 |
| $Al_2O_3$ | Balance |
| Specific surface area (m²/g) | 224 |
| Pore Volume (ml/g) | |
| 0 – 600 Å | 0.478 |
| 0 – 60 Å | 0.025 |
| 60 – 150 Å | 0.080 |
| 150 – 180 Å | 0.106 |
| 180 – 240 Å | 0.128 |
| 240 – 300 Å | 0.047 |
| 300 – 600 Å | 0.092 |
| P V I (%) | 76.5 |
| Bulk Density (g/ml) | 0.628 |

It is apparent from the foregoing examples that, according to the process of this invention, the silica and alkali metal components in the catalyst and the pore distribution thereof exhibit a remarkable effect on the improvement in the color, light and thermal stability of the refined wax and also on the control of side reactions such as isomerization.

What is claimed is:

1. A catalyst comprising at least one metal hydrogenating component on a porous alumina/silica carrier containing from about 5 to 25 wt.% of silica and from 0.2 to 5 wt.% of an alkali metal component and being further characterized in that:

(a) the volume of pores having a diameter in the range of 60 to 150 Å is greater than 80% of the volume of pores having a diameter in the range of 0 to 150 Å; and (b) the volume of pores having a diameter in the range of 0 to 600 Å is in the range of from about 0.45 to 0.60 ml/g.

2. The catalyst of claim 1 wherein said metal hydrogenating component is selected from the group consisting of metals of Group VI and Group VIII and mixture thereof.

3. The catalyst of claim 2 wherein said metal hydrogenating component comprises nickel.

4. The catalyst of claim 2 wherein said metal hydrogenating component is selected from the group consisting of chromium, molybdenum, tungsten, iron, cobalt, nickel and mixture thereof.

5. The catalyst of claim 4 wherein the silica content ranges from 8 to 20 wt.% of the carrier.

6. The catalyst of claim 5 wherein the alkali metal component is present in an amount ranging from 0.3 to 1 wt.% of the carrier.

7. The catalyst of claim 6 wherein the total pore volume ranges from 0.5 to 1.0 ml/g.

8. The catalyst of claim 7 wherein the catalyst has a specific surface area ranging from 200 to 300 m$^2$/g.

9. The catalyst of claim 8 wherein said alkali metal component is an oxide of one or more metals selected from the group consisting of lithium, potassium and sodium.

10. The catalyst of claim 9 wherein the metal hydrogenating component is selected from the group consisting of a mixture of molybdenum and cobalt, molybdenum and nickel, tungsten and nickel, molybdenum, cobalt and nickel and tungsten, cobalt and nickel.

* * * * *